May 8, 1962 D. W. PERKINS 3,034,074
FULL-WAVE MODULATOR CIRCUITS
Filed Oct. 30, 1957

INVENTOR:
DONALD W. PERKINS,
BY Donald C Keaveney
HIS ATTORNEY.

United States Patent Office 3,034,074

Patented May 8, 1962

3,034,074
FULL-WAVE MODULATOR CIRCUITS

Donald W. Perkins, De Witt, N.Y., assignor to General Electric Company, a corporation of New York Filed Oct. 30, 1957, Ser. No. 693,346
1 Claim. (Cl. 332—2)

Figure 1:
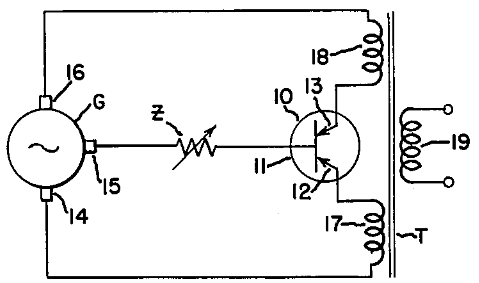

This invention relates to full-wave modulator circuits. More particularly, this invention relates to a single transistor full-wave balanced modulator circuit which may be used in such applications as the control of signal amplitude, voltage regulator circuits, frequency converters, or the like.

Full-wave modulator circuits are commonly used to symmetrically vary the amplitude of both the positive-going and negative-going excursion of alternating current wave forms in response to some control signal Known circuits for accomplishing this function tend to require a relatively large number of component. Transistorized full-wave modulator circuits, for example, have in the past required at least two or more transistors.

It is therefore an object of this invention to provide a single transistor full-wave modulator circuit.

It is a further object of this invention to provide a full-wave balanced modulator circuit which may be used to control the amplitude of an alternating current signal or which may be embodied in such circuits as frequency converters or voltage regulators.

It is a further object of this invention to provide an economical and reliable transistorized full-wave balanced modulator circuit.

Briefly, in accordance with one aspect of this invention, a transistor having bilateral or symmetrical characteristics has a modulating-signal responsive variable impedance connected to its base electrode. Additional circuit means are then provided to connect the transistor and the variable impedance in a bridge circuit which in turn is connected in series with a source of alternating current power the output of which is to be modulated by a signal applied to the variable impedance.

Figure 2:
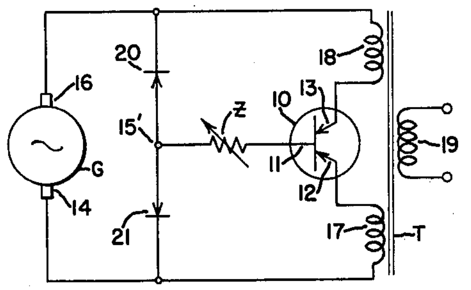
Figure 3:
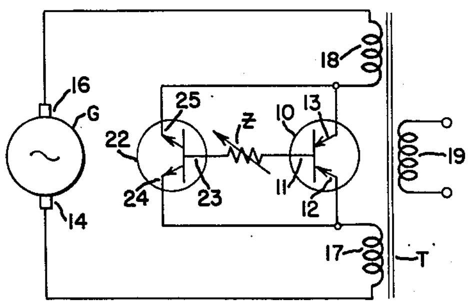
Figure 4:
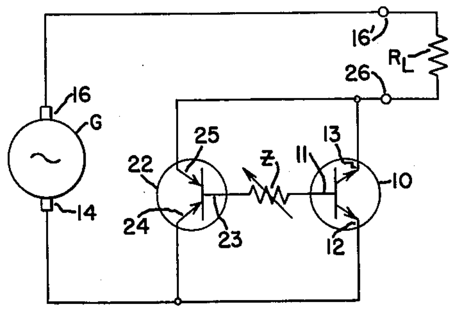
Figures 5, 6:
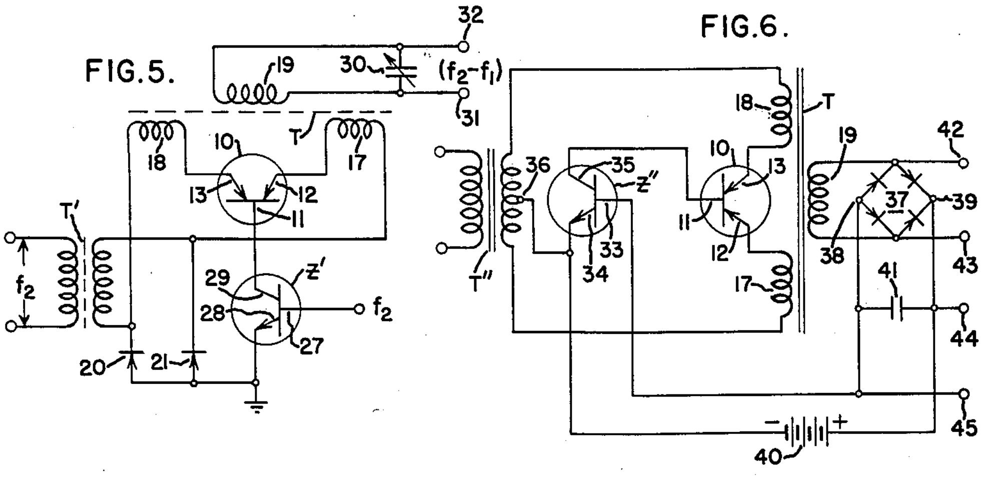

While the novel and distinctive features of the invention are particularly pointed out in the appended claims, a more expository treatment of the invention, in principle and in detail, together with additional objects and advantages thereof, is afforded by the following description and accompanying drawing in which like reference characters are used to indicate like parts throughout and wherein:

FIG. 1 is a schematic circuit diagram of one embodiment of the invention,

FIGS. 2, 3, and 4 are schematic circuit diagrams of modifications of the circuit of FIG. 1, FIG. 5 is a schematic circuit diagram of a frequency converter utilizing the basic principles of the invention and, FIG. 6 is a schematic circuit diagram of a voltage regulator utilizing the basic principles of the invention.

Turning now to the drawings and in particular to FIG. 1 there is shown a full-wave balanced modulator circuit including a transistor 10 having a base electrode 11, an emitter electrode 12, and a collector-electrode 13. It will be noted that both the electrodes 12 and 13 are indicated in the drawing as being emitters of a PNP transistor. This designation is used to indicate that transistor 10 is a symmetrical switching transistor, that is, a transistor having bilateral characteristics such as to afford equivalent operation when the functions of its emitter and collector electrodes are interchanged. In such transistors the emitter-base and collector-base junctions have the same physical and electrical properties. Transistor 10 may, for example, be of the type commercially designated by the General Electric Company as a 4JD1B3 or a 4JD1B4 symmetrical switching transistor. Of course, it will be understood that many transistors approximate to some degree the bilateral characteristics of a symmetrical switching transistor. However, it is preferred in the present invention to use a transistor expressly designed to have bilateral characteristics.

A center tapped generator G supplies alternating current power to the transistor 10 through the split-primary windings of output transformer T. Generator G has output terminals 14 and 16 and a center tap output terminal 15. A modulating-signal responsive variable impedance is connected between center tap terminal 15 and the base electrode 11 of transistor 10. A modulated alternating current signal output is derived from the circuit via transformer T. The split-primary of transformer T consists of first and second windings 17 and 18 respectively. In order to keep the circuit balanced, it is desirable that the windings 17 and 18 each have the same number of turns. The winding 17 has one end connected to the emitter electrode 12 of transistor 10 and the other end connected to the output terminal 14 of generator G. The winding 18 has one end connected to the collector electrode 13 of transistor 10 and the other end connected to the output terminal 16 of generator G. Output is taken from the transformer T via he terminals of a secondary winding 19. This output is modulated in amplitude as a function of an input signal applied to the variable impedance Z. Since the current through impedance Z is a direct current, this variable impedance can be replaced by another transistor, a vacuum tube, a photocell, or any device having a controllable direct current impedance.

The operation of the circuit is as follows. When terminal 16 of generator G is positive, current will flow through winding 18 of transformer T, electrodes 13 and 12 of transistor 10 and, thence through winding 17 of transformer T back to the other terminal 14 of generator G. As is well known in the art the magnitude of the current flowing in the collector-emitter circuit of transistor 10 is controlled by the current flowing in the base electrode circuit of the transistor. This base current is in turn controlled by the magnitude of the variable impedance Z which is returned to the center tap of generator G. When terminal 16 of generator G goes negative and terminal 14 goes positive, the direction of current flow through the split-primary windings of the transformer and the emitter-collector circuit of the transistor will be reversed. However, the current in the base electrode circuit, that is, the current through the impedance Z does not reverse in direction by virture of the fact that the transistor 10, the split-primary windings 17 and 18 of the transformer T, and the windings of the generator G are acting as a full-wave rectifier in a bridge circuit supplying direct current to impedance Z. The direct connection of one end of impedance Z to the center tap of generator G in the circuit of FIG. 1 serves to establish a direct current return from Z to the power source. The characteristics of transistor 10 are such as to cause the base potential to be nearly equal to the potential at the electrode which is functioning as an emitter. Hence, on each half cycle the base potential rises with respect to the center tap of the generator and forces direct current through impedance Z. The magnitude of the current in impedance Z is controlled by the magnitude of this impedance which, in practice, is made responsive to an input modulating signal. The output signal from transformer T is an inverse function of the impedance of the transistor 10 which is in turn a direct function of the impedance of Z. Therefore, the output signal will increase as Z decreases and vice versa. Hence, the alternating current output signal on winding 19 will be modulated in amplitude as a function of the modulating signal applied to variable impedance Z.

It should also be noted that there is an output voltage regulating action inherent in the circuit of FIG. 1 for any given value of Z. That is to say, if the load on secondary winding 19 increases, tending to draw more current from the secondary, the voltage developed across windings 17 and 18 will drop causing more of the generator voltage to be developed across impedance Z. The resulting increased current flow through Z decreases the impedance of the transistor 10 in turn resulting in increased current flow through primary windings 17 and 18, thus tending to correct for the change in load conditions.

In FIG. 2 there is shown a modification of the circuit of FIG. 1 wherein a pair of diodes, or other asymmetrically conducting impedances, are connected in back-to-back series circuit relationship across the output terminals 14 and 16 of generator G. The impedance Z is then connected between the base electrode 11 of transistor 10 and the junction point 15' of the two diodes rather than being directly returned to a center tap on a winding of generator G. The circuit of FIG. 2 is otherwise the same as that of FIG. 1 and will not be further described since corresponding reference characters have been used to indicate corresponding components. The circuit of FIG. 2 may conveniently be used with a generator which has not been provided with a center tap. Its operation is entirely similar to that of the circuit of FIG. 1 in principle. The output signal, however, is a slightly different function of Z for the two circuits by virtue of the introduction of the additional diode impedances in the circuit of FIG. 2. In FIG. 2 the minimum potential drop across impedance Z is one-half the generator voltage and the maximum is nearly full generator voltage. In FIG. 1 the minimum drop across Z is zero volts whereas the maximum drop is nearly half the generator voltage. It should also be noted that if the diodes 20 and 21 are replaced by resistors these impedance relations would again be changed producing a still different output function. If resistors are used at 20, 21, the circuit of FIG. 2 approaches that of FIG. 1 in its operation where the effective impedance of the two resistors is a fixed part of Z.

In FIG. 2 the impedance Z has direct current supplied to it from a bridge rectifier circuit consisting of the diodes 20 and 21, the circuit of transistor 10, and the windings 17 and 18 of transformer T. This bridge circuit is connected in series across the output terminals 14 and 16 of generator G. As in FIG. 1, the amplitude of the output signal derived from winding 19 of transformer T may be controlled by varying the magnitude of impedance Z.

If greater power handling capacity is required than can be obtained from the circuits shown in FIGS. 1 or 2, a bilateral PNP transistor 10 and a second bilateral NPN transistor 22 may be operated back-to-back as shown in FIG. 3, thus affording twice the output power available from a single transistor. Of course, it will be understood that the transistors 10 and 22 could be interchanged, the only essential point being that both transistors have similarly rated bilateral characteristics and that they are of opposite polarity types, i.e., one is NPN and the other PNP. In FIG. 3 the variable impedance Z is connected between the base electrode 11 of PNP transistor 10 and the base electrode 23 of NPN transistor 22. As noted above, both of the transistors 10 and 22 are of the bilateral type. The "emitter" electrodes 12 and 24 of the two transistors respectively are both connected to one end of winding 17 which has its other end connected to terminal 14 of generator G. The "collector" electrodes 13 and 25 of the two transistors 10 and 22 respectively are both connected to one end of winding 18 which has its other end connected to terminal 16 of generator G. As in FIGS. 1 and 2 an output signal is derived from winding 19 of transformer T and the amplitude of this signal may be varied as a function of the magnitude of the impedance Z. It will be noted that in FIG. 3 the bridge circuit supplying direct current to the impedance Z is formed entirely by the two transistors 10 and 22 which are connected in parallel between the two windings of the split-primary of transformer T, thus affording twice the power handling capacity available from the circuits of FIGS. 1 or 2.

It should be noted that although electrodes 12 and 24 have been designated as "emitters" and electrodes 13 and 25 as "collectors," the bilateral nature of the transistors permits all of these electrodes to act as emitters. At any given instant, if electrode 12 is acting as an emitter then electrode 25 will also act as an emitter, whereas if electrode 13 is acting as an emitter then electrode 24 will also act as an emitter.

It will be noted that in each of the circuits of FIGS. 1, 2, and 3 the transformer T is provided with split-primary windings in order to ensure that each of the circuits will be balanced so as to provide a full-wave balanced modulator action. In some applications, however, a direct output may be more desirable than a transformer coupled output. In FIG. 4 there is shown a modification of the circuit of FIG. 3 which will afford a direct coupled output and yet retain the full-wave balanced modulator action. In FIG. 4 the bridge circuit consisting of the two transistors 10 and 22 and the variable impedance Z connected as described in conjunction with FIG. 3 is connected as a whole between terminal 14 of generator G and an output terminal 26. The other output terminal 16 of generator G is brought directly out as an output terminal as shown at 16'. A load impedance $R_L$ may then be connected between terminals 16' and 26. Since the bridge circuit for each transistor, 10 or 22, is completed by the other transistor, the bridge circuit is complete within itself and can be located as a series element anywhere in the network consisting of the generator, load, and bridge circuit without disturbing the balanced operation.

It will be noted that in each of the circuits of FIGS. 1, 2, 3, and 4 the bilateral transistor 10 has its emitter-collector circuit connected in series with a source of alternating current power. The modulating-signal responsive impedance Z has one end connected to the base electrode of transistor 10 while its other end is provided with a direct current return connection to the alternating current power source by connecting the impedance Z across the diagonals of a bridge circuit, including transistor 10. Each of the elementary full-wave balanced modulator circuits of FIGS. 1, 2, 3, and 4 may, of course, be used in any application requiring such a circuit. In FIGS. 5 and 6 two such applications of particular utility are shown by way of example. In FIG. 5 a circuit of the type shown in FIG. 2 is shown connected as a frequency converter or heterodyne detector, whereas in FIG. 6 a circuit of the type shown in FIG. 1 is shown connected as a voltage regulator.

In FIG. 5 like reference characters are used to identify components described in connection with FIG. 2. However, the generator G of FIG. 2 is replaced by a signal from a local oscillator of frequency $f_1$ which is applied to the circuit through a transformer T'. The impedance Z of FIG. 2 is replaced by a signal transistor Z' having a base electrode 27, an emitter electrode 28, and a collector electrode 29. The emitter electrode 28 is connected to the junction point of diodes 20 and 21 which may also be taken as the ground point of the circuit. The collector electrode 29 is connected to the base electrode 11 of the bilateral transistor 10. An incoming signal of frequency $f_2$ is applied to the base electrode of transistor Z' to vary the impedance of its emitter-collector circuit in accordance with the instantaneous magnitude of the signal $f_2$. The secondary winding 19 of output transformer T is tuned as by a variable capacitor 30 to the difference frequency between the two signals $f_1$ and $f_2$, that is, the secondary winding 19 is tuned to resonance at a frequency $(f_2-f_1)$. This difference frequency component carrying the amplitude modulation of the signal $f_2$ will appear at output terminals 31 and 32. It should be noted that since the circuit is balanced by virtue of the above noted bridge connection, the carrier frequency $f_2$ will not appear as a component of the current flowing in the primary windings 17 and 18 of transformer T. This suppression of the carrier frequency occurs in accordance with well known principles applicable to any full-wave balanced modulator circuit.

In FIG. 6 a circuit of the type shown in FIG. 1 is shown connected as a low power voltage regulator. Again, like reference characters have been used to identifiy components which have already been described in connection with the above discussion of FIG. 1. In FIG. 6 the generator G is replaced by a transformer T'' through which unregulated alternating current power is applied to the circuit. The variable impedance Z of FIG. 1 is replaced by a signal transistor Z'' having a base electrode 33, an emitter electrode 34, and a collector electrode 35. The emitter electrode is connected to a center tap 36 on the secondary winding of transformer T''. The collector electrode 35 is connected to the base electrode 11 of bilateral transistor 10. The secondary winding 19 of output transformer T is connected across the input terminals of a full-wave bridge rectifier circuit 37. The negative D.-C. output terminal 38 of this bridge circuit is connected directly to the base electrode 33 of transistor Z''. The positive D.C. output terminal 39 of bridge rectifier circuit 37 is connected through a battery or other standard voltage reference source 40 to the emitter 34 of transistor Z''. A filter condenser 41 is connected between terminals 38 and 39. The polarity of battery 40 is such that its output will oppose or be subtracted from the output of the bridge rectifier circuit 37 in order to provide a feedback signal to be applied to the base electrode of transistor Z''. When an unregulated alternating current voltage is applied to the primary winding of input transformer T'', a regulated alternating current voltage will appear between output terminals 42 and 43, whereas a regulated direct current voltage will appear between output terminals 44 and 45.

Of course, it will be apparent that if a lower degree of regulation can be tolerated the signal transistor Z'' can be omitted and an appropriately polarized feedback signal applied directly to base electrode 11 of bilateral transistor 10.

The operation of the circuit is as follows. If the rectified D.-C. voltage appearing between terminals 38 and 39 of bridge circuit 37 is greater than the voltage of battery 40, a negative bias is placed on the base electrode 33 of NPN transistor Z''. This bias cuts off the flow of current through signal transistor Z'' which in turn cuts off the flow of current through the bilateral power transistor 10, thus increasing the impedance in series with the primary windings of output transformer T. This, of course, reduces the flow of current through the primary windings 17 and 18 of transformer T thereby reducing the magnitude of the output voltage induced in secondary winding 19 until the output voltage appearing between terminals 38 and 39 is equal to the voltage of battery 40. If the rectified direct current voltage appearing between terminals 38 and 39 is less than the battery voltage 40, a positive bias voltage will be placed on the base electrode 33 of signal transistor Z'', thus increasing the current flow through this transistor and in turn increasing the current flow through the bliateral power transistor 10. This reduces the impedance in series with the primary winding of the transformer T and thereby increases the output voltage until the voltage at terminals 38 and 39 is equal to the voltage of battery 40.

Although the frequency converter of FIG. 5 has been shown by way of example as including a full-wave balanced modulator circuit of the type shown in FIG. 2 and the voltage regulator of FIG. 6 has been shown as including a circuit of the type shown in FIG. 1, it will be understood that any one of the circuits of FIGS. 1, 2, 3, or 4 can be used in circuits of the type shown by way of example in FIGS. 5 and 6, that is to say, in any circuit which incorporates or utilizes a full-wave balanced modulator configuration.

While the principles of the invention have now been made clear, there will be immediately obvious to those skilled in the art many modifications in structure, arrangement, proportions, the elements and components used in the practice of the invention, and otherwise, which are particularly adapted for specific environments and operating requirements without departing from those principles. The appended claims are therefore intended to cover and embrace any such modifications within the limits of the true spirit and scope of the invention.

What I claim and desire to secure by Letters Patent of the United States is:

A full-wave balanced modulator circuit comprising, a first bilateral transistor having at least a base electrode, an emitter electrode, and a collector electrode, said transistor having bilateral characteristics such as to afford equivalent operation when the functions of its emitter and collector electrodes are interchanged; an unmodulated alternating current power source; a modulating-signal responsive variable impedance having one end connected to the base electrode of said transistor; means connecting said first transistor in series with said power source, and means connecting said variable impedance and said first transistor in a bridge circuit in which said variable impedance is in a direct current return path to said power source, said series circuit including an output load device; said bridge circuit comprising a second bilateral transistor having base, emitter, and collector electrodes; said first and second bilateral transistors being of opposite polarity types; said variable impedance being connected between the base electrodes of said first and second transistors; the emitter electrodes of said first and second transistors both being directly connected to one terminal of said power source, and the collector electrodes of said first and second transistors both being connected to the other terminal of said power source through said output load device.

References Cited in the file of this patent

UNITED STATES PATENTS

| | | |
|---|---|---|
| 1,672,056 | Carson | June 5, 1928 |
| 2,486,776 | Barney | Nov. 1, 1949 |
| 2,795,762 | Sziklai | June 11, 1951 |
| 2,799,784 | Harris | July 16, 1957 |
| 2,816,238 | Elliott | Dec. 10, 1957 |
| 2,820,199 | Greefkes | Jan. 14, 1958 |
| 2,881,332 | Jensen | Apr. 7, 1959 |
| 2,889,467 | Endres et al. | June 2, 1959 |
| 2,891,156 | Crow | June 16, 1959 |
| 2,898,476 | Jensen | Aug. 4, 1959 |
| 2,943,271 | Willis | June 28, 1960 |